Patented May 18, 1937

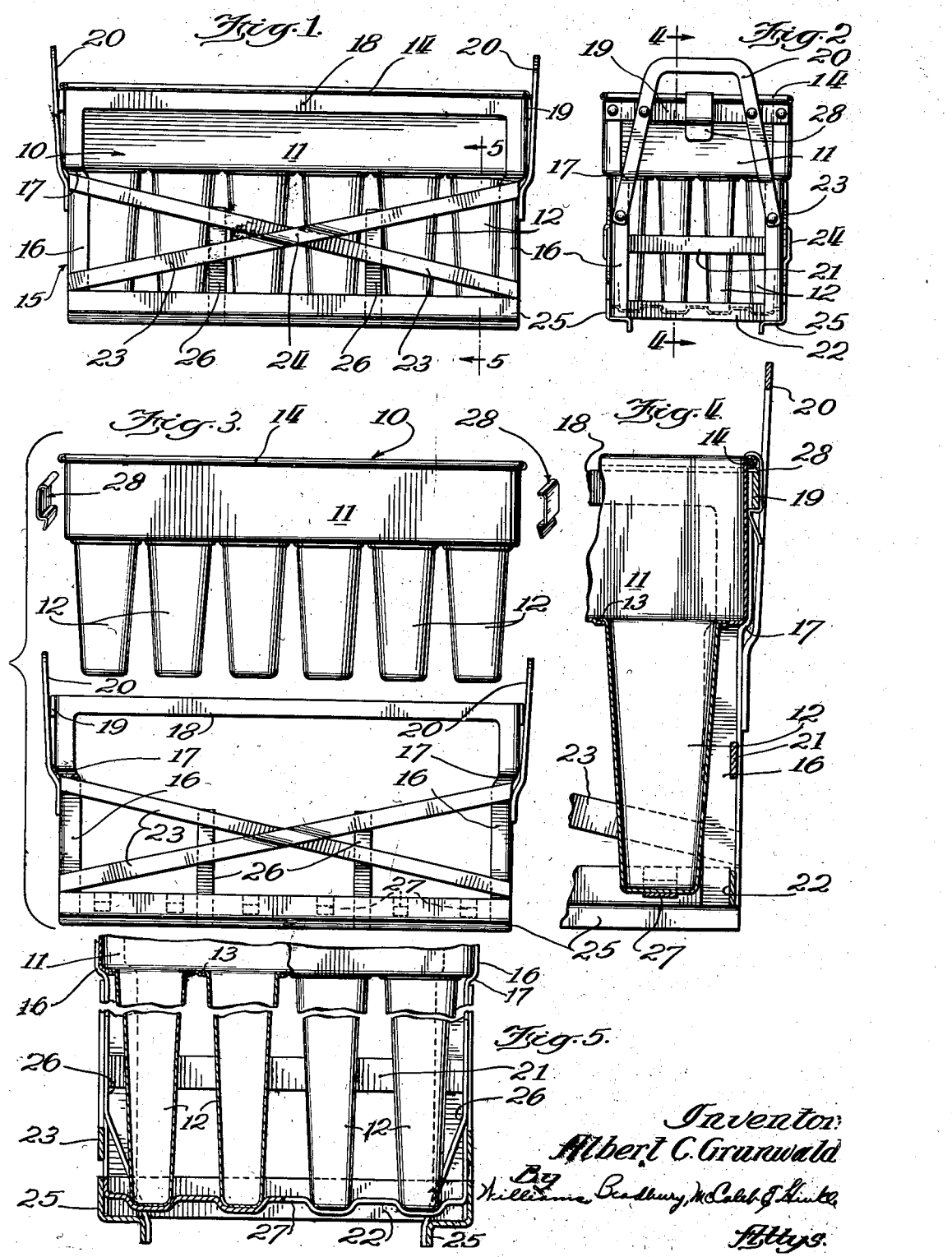

2,080,816

UNITED STATES PATENT OFFICE 2,080,816

MOLD FOR FROZEN CONFECTIONS

Albert C. Grunwald, River Forest, Ill., assignor to Precision Metal Workers, Chicago, Ill., a corporation of Illinois Application December 22, 1934, Serial No. 758,741

3 Claims. (Cl. 107—19)

This invention relates to molds for frozen confections, and particularly to molds for frozen confections of the well known type which are provided with sticks or handles whereby the confection may be manipulated while being consumed. These confections are usually of the ice cream or fruit juice ice type.

In the manufacture of such confections molds are employed on a considerable scale, each mold being provided with a large number of pockets so that a large number of confections may be frozen at the same time. These pockets are normally located in regular order to facilitate further manipulation. In Patent No. 1,984,724 granted December 18, 1934 on the application of Rudolph G. Birr, is disclosed an apparatus for forcing sticks or handles into the pockets of the mold. In Patent No. 1,976,610 issued October 9, 1934 on the application of the present applicant, is disclosed a holder for frozen confections which is adapted to cooperate with a mold so as to engage all the sticks or handles of the frozen confections therein, to effect removal of the confections and further manufacturing operations, such as coating and the like.

These devices are predicated upon molds having pockets in regular orderly relation, and it is very important that this orderly relation be preserved and distortion of the pockets out of position relative to each other and relative to the guide members for the mold as a whole, be avoided at all times. It will readily be understood that if the pockets are thus distorted, the sticks or handles will not be properly located centrally of the frozen confection and difficulties will arise in connection with the removal and transportation of the confections by means of a holder of the type referred to.

The principal object of the present invention is to provide a mold which will avoid these difficulties.

A further object of the invention is to provide a mold comprising the mold proper and a protecting frame therefor which is separable therefrom so that either portion may be replaced if rendered inefficient, owing to distortion.

Other objects, advantages and capabilities of the invention will appear from the following description of a preferred embodiment thereof, taken in conjunction with the accompanying drawing, in which Figure 1 is a front elevation showing the mold in its protecting frame;

Fig. 2 is a side elevation thereof;

Fig. 3 is a front elevation of the elements in disassembled condition;

Fig. 4 is a fragmentary sectional detail taken on the line 4—4 of Fig. 2, on a considerably larger scale, and Fig. 5 is a sectional detail view taken on the line 5—5 of Fig. 1.

Referring to the drawing, the mold proper is designated by the reference numeral 10. This mold comprises a pan portion 11, the bottom of which is provided with openings arranged in regular rows for the reception of pockets 12 which extend downwardly from the pan 11. In the embodiment of the invention illustrated, the pan 11 is substantially rectangular in plan and four longitudinal rows of pockets 12 are provided. Each row comprises six pockets which are arranged in transverse rows of four. Each pocket is preferably drawn from a piece of metal so that no seams or joints are provided and the walls of the pocket converge downwardly so as to provide draft for the frozen confection when being withdrawn from the pocket. At its upper edge the pocket is provided with a flange 13 which is secured to the bottom of the pan 11 around one of the openings therein.

In the use of the mold in the manufacture of frozen confections, a certain amount of material is supplied to each pocket and then the mold is placed in a freezing medium. The pan 11 which projects substantially above the pockets 12, prevents any of the freezing medium being splashed into contact with the comestibles. The upper edge of the pan 11 is preferably reinforced by a bead 14. The protecting frame in which the mold is located is designated as a whole by the reference numeral 15. This mold is fabricated from stout strapping material. It comprises four corner posts 16 of angular cross section. These corner posts are displaced outwardly, as indicated at 17, this displacement being such that the angle line of the upper portion of the posts is displaced obliquely outwardly with respect to the angle line of the lower portions of the posts. This displacement provides shoulders in the side webs of the posts 16 at the point 17, which shoulders extend in the direction of the sides and in the direction of the ends.

The displacement at 17 is provided at an appropriate point so that the corners of the pan portion 11 rest upon these shoulders, as seen in Figs. 4 and 5, when the mold is assembled. The protecting frame also comprises two longitudinal members 18 located slightly below the normal position of the bead 14, as best shown in Fig. 1. The longitudinal elements 18 may suitably be integral with the posts 16. The frame 15 also comprises transverse members 19 which are riveted or otherwise rigidly secured to the upper ends of the posts 16. The transverse elements 19 are also located slightly below the normal level of the bead 14.

The frame 15 is provided at its ends with suitable handles 20. These handles are suitably formed of strap metal bent to bail or U-shaped formation. The handles 20 are secured to the transverse elements 19 and to the corner posts 16 by rivets or other suitable means. Preferably the limbs of the inverted U-shaped member diverse downwardly in the manner best seen in Fig. 2, so that the brace, transverse element 19 and the posts 16 together serve to render the frame more rigid. The handles 20 may be bent slightly, as best seen in Figs. 1, 3, and 4, so as to provide clearance for the bottom of the pan portion 11.

The posts 16 are further connected together by transverse straps 21 and 22 which may suitably be located inside the end webs of the posts 16 and secured thereto by suitable means, for example, by spot welding. The posts 16 are also connected by oblique straps 23, which are best seen in Figs. 1 and 3. These straps are located on the outside of the posts 16 and extend from a position near the bottom of one post to a position just below the point 17 of the other post, these straps crossing at the point 24. The straps 23 may be secured to the posts 16 in any suitable manner, for example by spot welding, and they may be secured together at the point 24 in the same manner.

As best seen in Fig. 2, the lower ends of the posts 16 rest upon the intermediate webs of longitudinally directed rails 25 which are of Z formation. These rails comprise upwardly directed webs which engage the outer faces of the posts 16, to which they may be secured by spot welding. They also comprise downwardly directed webs which aid in guiding the mold during use and also facilitate exact placing of the mold with respect to other machinery. These lower webs are reinforced by struts 26, at suitable points along the length of the frame. These struts 26 are secured to one of the straps 23 and extend obliquely inwardly in the downward direction, their lower ends being secured to the downwardly directed webs of the members 25.

The frame is provided with means for engaging the lower ends of the pockets 12 to prevent displacement thereof, which would have the result of positioning the stick or handle obliquely in the frozen confection. This means may suitably comprise stout straps 27 which are corrugated or recessed along their length. These straps are located transversely in the frame at an appropriate level, that is near the bottom of the frame, and may suitably be secured to the upper webs of the angle irons 25, by spot welding or other suitable means. The relation of the straps 27 to the pockets 12 is best seen in Fig. 5.

To assemble the mold within its protecting frame it is merely necessary to insert the mold and pockets downwardly into the rectangular formation presented by the straps 18 and 19. This movement will bring the lower ends of the pockets 12 into nested condition in the formations of the straps 27 and will bring the corners of the pan 11 into proximity to the shoulders on the posts 16 at the position 17.

I provide securing means which clamp the mold as a whole downwardly with some pressure so as to brace firmly the lower ends of the pocket 12 into contact with the straps 27 and to press the corners of the pan portion 11 firmly against the corners on the posts 16. In this condition both structures brace and fortify each other and a firm non-rattling union is insured. For this purpose I prefer to employ clips 28 which are provided with an arcuate formation at their upper ends, whereby they are enabled to grip the bead 14 of the mold. Adjacent their lower ends the clips 28 are bent to provide a portion which is adapted to engage beneath the strap 19, as best seen in Fig. 4. As suggested in this figure, a certain clearance between the strap 19 and the pan 11 is preferably provided so that this portion of the clamp may project inwardly beyond the strap 19. The bend is such that the strap tends to bear upwardly on the inside of the strap 19. The lower end of the clip is flexed outwardly slightly so that it may be engaged by a finger for removal. When this downwardly projecting end of the clip 28 is pulled outwardly, the pressure of the bent portion upon the underside of the strap 19 is released and the clip may very easily be pulled outwardly and removed from the mold. I prefer to employ a clip 28 at each end below the handle 20, which serves to protect the clip from other objects which might accidentally release it. I may, however, provide a greater number of clips, located for example along the sides of the mold and engaging the straps 18.

It will thus be understood that I have provided a strong unit having two portions which mutually fortify each other against shocks and against distortion, which portions may readily be separated from each other and as readily combined again. This structure, while being relatively light, is highly resistant with respect to distortion and at all times maintains the mold pockets 12 in proper relation to each other, to the pan 11 and to the guide means 25.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A mold for frozen confections and the like comprising a crate-like frame and a mold structure within the frame, said mold structure comprising a pan and pockets depending therefrom, said pockets being arranged in longitudinal and transverse rows, means on said frame engaging and supporting said pan, rails on said frame bent to provide individual nests for the lower ends of the pockets, longitudinal guide rails on said frame, and removable means firmly securing the frame and mold structure together whereby the lower ends of the pockets are firmly seated in their nests for preventing displacement of said pockets and maintaining said pockets in unchanging relation to said guide rails.

2. A mold for frozen confections comprising a crate-like frame and a mold structure adapted to be slipped downwardly thereinto, said mold structure comprising a pan and pockets depending therefrom, said pockets being arranged in longitudinal and transverse rows, said frame comprising corner posts of angle iron bent to provide shoulders for engaging and supporting said pan, transverse straps on said frame bent to provide individual depressions in which the lower ends of said pockets are received and supported, and removable clips securing the frame and mold structure firmly and removably together.

3. A crate-like frame for a mold for frozen confections, comprising corner posts of angle iron bent at an intermediate point to provide shoulders thereon, rails of Z section to which said posts are rigidly secured, said rails having downwardly directed webs adapted to serve as guide rails, longitudinal and transverse members connecting said posts and serving as protecting elements, and transverse straps extending between said rails and rigidly secured thereto, said straps being corrugated to provide individual nests for the reception and support of the lower ends of the mold pockets.

ALBERT C. GRUNWALD.